(12) United States Patent
Xi et al.

(10) Patent No.: US 9,955,778 B2
(45) Date of Patent: May 1, 2018

(54) ORAL CARE IMPLEMENT AND METHOD OF MANUFACTURING AN ORAL CARE IMPLEMENT

(71) Applicant: COLGATE-PALMOLIVE COMPANY, New York, NY (US)

(72) Inventors: Wen Jin Xi, Shanghai (CN); Yan Mei Ji, YangZhou (CN); Xiang Ji Ding, YangZhou (CN); Bo Zhang, YangZhou (CN); Yu Liu, Wuxi (CN)

(73) Assignee: Colgate-Palmolive Company, New York, NY (US)

( * ) Notice: Subject to any disclaimer, the term of this patent is extended or adjusted under 35 U.S.C. 154(b) by 0 days. days.

(21) Appl. No.: 15/328,586

(22) PCT Filed: Jul. 30, 2014

(86) PCT No.: PCT/CN2014/083286
§ 371 (c)(1),
(2) Date: Jan. 24, 2017

(87) PCT Pub. No.: WO2016/015237
PCT Pub. Date: Feb. 4, 2016

(65) Prior Publication Data
US 2017/0208933 A1    Jul. 27, 2017

(51) Int. Cl.
*A46B 9/04*       (2006.01)
*A46D 3/00*       (2006.01)
(Continued)

(52) U.S. Cl.
CPC ................ *A46B 9/04* (2013.01); *A46D 3/00* (2013.01); *B29C 45/1676* (2013.01);
(Continued)

(58) Field of Classification Search
CPC ................ A46B 9/04; B29C 45/14385; B29L 2031/425; A46D 3/005
(Continued)

(56) References Cited

U.S. PATENT DOCUMENTS 6,298,516 B1    10/2001    Beals
6,996,870 B2    2/2006    Hohlbein
(Continued)

FOREIGN PATENT DOCUMENTS

CN    202143509 U    2/2012
CN    102669928 A    9/2012
(Continued)

OTHER PUBLICATIONS

International Search Report and the Written Opinion of the International Searching Authority issued in international application PCT/CN2014/083286 dated May 6, 2015.

*Primary Examiner* — Laura C Guidotti

(57) ABSTRACT

A method of manufacturing an oral care implement comprising: (a) providing a body comprising a handle portion and a head portion, the head portion having a hole extending there through from a first side to a second side; (b) providing a layer of first material on the handle portion and the head portion to form a subassembly comprising a handle section, comprising the handle portion and a first portion of the layer of first material, and a head section, comprising the head portion and a second portion of the layer of first material; and (c) then injection molding a second material onto the head section to form one or more oral care elements of the second material on the head section and a member of the second material in the hole, which member is unitary with the one or more oral care elements.

18 Claims, 4 Drawing Sheets

(51) Int. Cl.
*B29C 45/16* (2006.01)
*B29K 21/00* (2006.01)
*B29L 31/42* (2006.01)

(52) U.S. Cl.
CPC . *A46B 2200/1066* (2013.01); *B29K 2021/003* (2013.01); *B29L 2031/425* (2013.01)

(58) Field of Classification Search
USPC .............................................. 15/188; 300/21
See application file for complete search history.

(56) References Cited

U.S. PATENT DOCUMENTS

| | | | |
|---|---|---|---|
| 8,549,691 | B2 | 10/2013 | Moskovich et al. |
| 8,857,003 | B2 | 10/2014 | Hohlbein |
| 9,173,479 | B2 | 11/2015 | Butz et al. |
| 2002/0138931 | A1* | 10/2002 | Davies ..................... A46B 5/02 15/167.1 |
| 2003/0163884 | A1 | 9/2003 | Weihrauch |
| 2005/0006819 | A1 | 1/2005 | Weihrauch |
| 2005/0172439 | A1 | 8/2005 | Weihrauch |
| 2011/0239387 | A1* | 10/2011 | Hohlbein ........... A46B 11/0003 15/104.93 |
| 2013/0276252 | A1 | 10/2013 | Xi et al. |
| 2013/0291320 | A1 | 11/2013 | Kirchhofer |
| 2014/0173853 | A1 | 6/2014 | Kirchhofer et al. |

FOREIGN PATENT DOCUMENTS

| | | |
|---|---|---|
| CN | 102763980 A | 11/2012 |
| CN | 103385599 | 11/2013 |
| GB | 2050156 | 1/1981 |
| WO | 2000/064307 | 11/2000 |
| WO | WO2004/026162 | 4/2004 |
| WO | 2006/032367 | 3/2006 |
| WO | WO2009/072747 | 6/2009 |

* cited by examiner

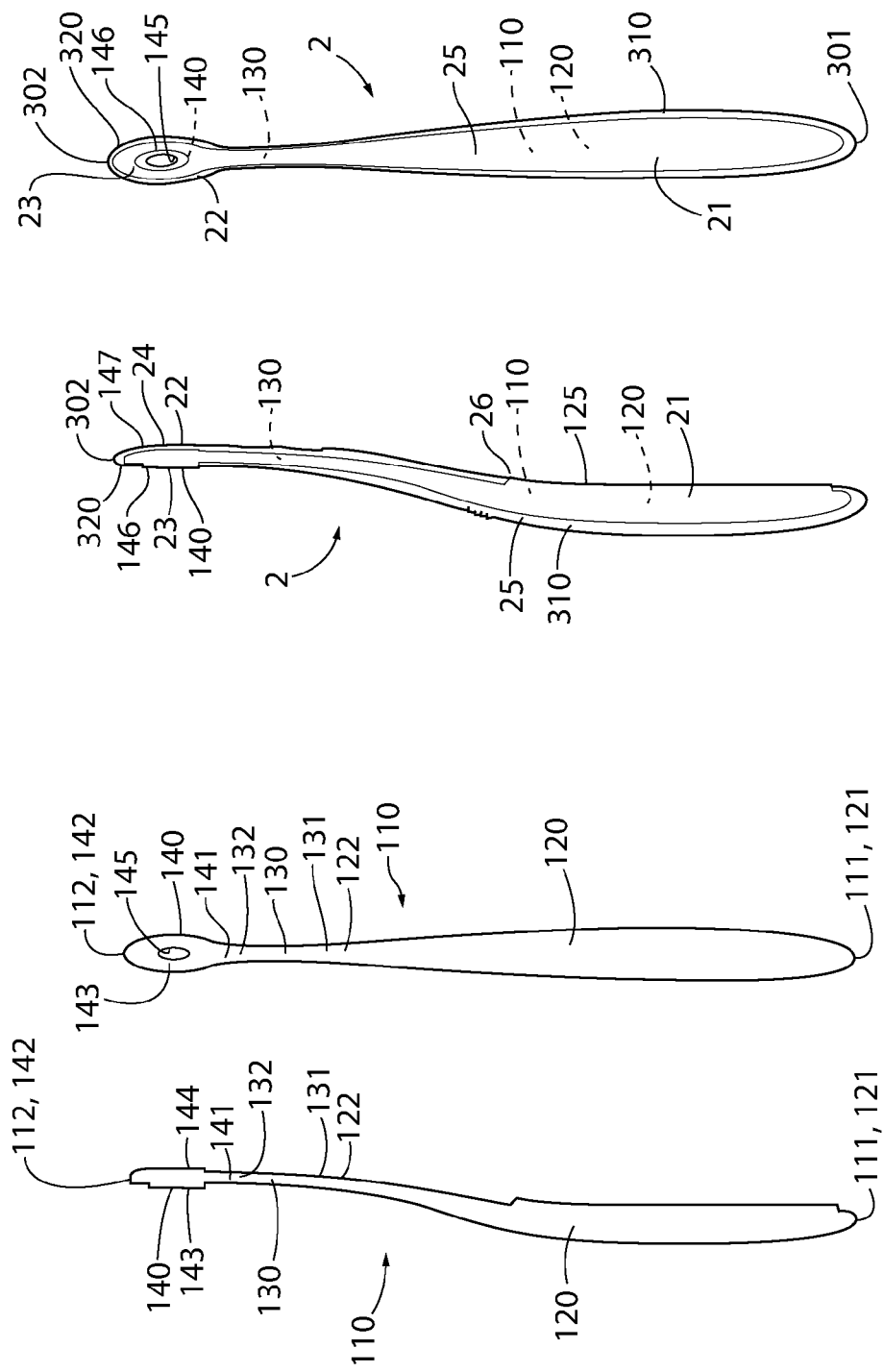

ORAL CARE IMPLEMENT AND METHOD OF MANUFACTURING AN ORAL CARE IMPLEMENT

BACKGROUND

The present invention relates to an oral care implement and to a method of manufacturing an oral care implement.

Various oral care implements, such as toothbrushes, that are supposedly comfortable to use are known in the art. One known oral care implement has a handle including a resilient grip feature, which makes holding the oral care implement comfortable. Another known oral care implement has a head including oral care elements made from a soft plastic, which makes brushing oral care surfaces with the oral care implement comfortable. A further known oral care implement has a head including peripheral bumpers made from a yieldable material, which provide soft contact areas on the portions of the head that might contact the gums during brushing.

There is a need for an oral care implement that is more comfortable to use. There also is a need for an oral care implement that is more robust. There further is a need for a simple method of manufacturing an oral care implement that is more comfortable to use and/or more robust.

BRIEF SUMMARY

An embodiment of the present invention provides a first method of manufacturing an oral care implement, the method comprising: providing a body comprising a handle portion and a head portion connected to the handle portion; providing a layer of first material on the handle portion and the head portion to form a subassembly comprising a handle section, comprising the handle portion and a first portion of the layer of first material, and a head section, comprising the head portion and a second portion of the layer of first material; and then injection molding a second material onto the head section to form one or more oral care elements of the second material on the head section.

Optionally, in step (a) the head portion has a hole extending therethrough from a first side of the head portion to a second side of the head portion; and step (c) comprises injection molding the second material onto the head section to form the one or more oral care elements of the second material on the head section and a member of the second material in the hole, which member is unitary with the one or more oral care elements.

Another embodiment of the present invention provides a second method of manufacturing an oral care implement, the method comprising: providing a body comprising a handle portion and a head portion connected to the handle portion, the head portion having a hole extending therethrough from a first side of the head portion to a second side of the head portion; providing a layer of first material on the handle portion and the head portion to form a subassembly comprising a handlesection, comprising the handle portion and a first portion of the layer of first material, and a headsection, comprising the head portion and a second portion of the layer of first material; and injection molding a second material onto the head section to form one or more oral care elements of the second material on the head section and a member of the second material in the hole, which member is unitary with the one or more oral care elements.

Optionally, in the second method, step (c) is performed after step (b).

Optionally, in either one of the first and second methods, step (c) comprises injection molding the second material onto the head section to form the one or more oral care elements of the second material on a first side of the head section and a pad of the second material on a second side of the head section, which pad is unitary with the member. Further optionally, the pad comprises a soft tissue cleaner.

Optionally, in either one of the first and second methods, formation of the subassembly in step (b) leaves the hole unblocked by the first material.

Optionally, in either one of the first and second methods, step (a) comprises providing the body by injection molding a third material.

Optionally, in either one of the first and second methods, the body has first and second ends and is elongate between the first and second ends, and step (b) comprises providing the layer of first material on one or both of the first and second ends of the body.

Optionally, in either one of the first and second methods, step (b) comprises providing the layer of first material on at least a majority of a surface area of one or both of the handle portion and the head portion. Further optionally, in either of the first and second methods, step (b) comprises providing the layer of first material on at least 75% of the surface area of one or both of the handle portion and the head portion.

Optionally, in either one of the first and second methods, the body is formed of plastic, such as a thermoplastic polymer, such as polypropylene or polyethylene terephthalate.

Optionally, in either one of the first and second methods, the body is formed of a material that is more rigid than the first material.

Optionally, in either one of the first and second methods, the first material is a resilient material, such as an elastomeric material, such as an elastomer, a thermoplastic elastomer (TPE), or styrene-ethylene/butylene-styrene (SEBS).

Optionally, in either one of the first and second methods, the first material is a translucent or transparent material.

Optionally, in either one of the first and second methods, the second material is a resilient material, such as an elastomeric material, such as an elastomer, a thermoplastic elastomer (TPE), or styrene-ethylene/butylene-styrene (SEBS).

Optionally, in either one of the first and second methods, the one or more oral care elements comprise one or more tooth cleaning elements and/or one or more tooth polishing elements.

Optionally, either one of the first and second methods comprises subsequently packaging the oral care implement.

A further embodiment of the present invention provides a first oral care implement, comprising: a handle comprising a handle portion of a body and a first portion of a layer of first material on the handle portion; and a head connected to the handle, the head comprising a head portion of the body, a second portion of the layer of first material on the head portion, and one or more oral care elements of a second material; wherein at least part of the second portion of the layer of first material is located between the head portion and the second material.

Optionally, the head portion has a hole extending therethrough from a first side of the head portion to a second side of the head portion; and a member of the second material extends through the hole, which member is unitary with the one or more oral care elements.

A further embodiment of the present invention provides a second oral care implement, comprising: a handle comprising a handle portion of a body and a first portion of a layer of first material on the handle portion; and a head connected to the handle, the head comprising a head portion of the body, a second portion of the layer of first material on the head portion, and one or more oral care elements of a second material; wherein the head portion has a hole extending therethrough from a first side of the head portion to a second side of the head portion; and wherein a member of the second material extends through the hole, which member is unitary with the one or more oral care elements.

Optionally, in the second oral care implement, at least part of the second portion of the layer of first material is located between the head portion and the second material.

Optionally, either one of the first and second oral care implements comprises the one or more oral care elements of the second material on a first side of the head and a pad of the second material on a second side of the head, which pad is unitary with the member. Further optionally, the pad comprises a soft tissue cleaner.

Optionally, in either one of the first and second oral care implements, the body has first and second ends and is elongate between the first and second ends, and the layer of first material covers one or both of the first and second ends of the body.

Optionally, in either one of the first and second oral care implements, the layer of first material is on at least a majority of a surface area of one or both of the handle portion and the head portion. Further optionally, in either one of the first and second oral care implements, the layer of first material is on at least 75% of the surface area of one or both of the handle portion and the head portion.

Optionally, in either one of the first and second oral care implements, all of a surface area of the head portion is covered with one or both of the first and second materials.

Optionally, in either one of the first and second oral care implements, the body is formed of plastic, such as a thermoplastic polymer, such as polypropylene or polyethylene terephthalate.

Optionally, in either one of the first and second oral care implements, the body is formed of a material that is more rigid than the first material.

Optionally, in either one of the first and second oral care implements, the first material is a resilient material, such as an elastomeric material, such as an elastomer, a thermoplastic elastomer (TPE), or styrene-ethylene/butylene-styrene (SEBS).

Optionally, in either one of the first and second oral care implements, the first material is a translucent or transparent material.

Optionally, in either one of the first and second oral care implements, the second material is a resilient material, such as an elastomeric material, such as an elastomer, a thermoplastic elastomer (TPE), or styrene-ethylene/butylene-styrene (SEBS).

Optionally, in either one of the first and second oral care implements, the one or more oral care elements comprise one or more tooth cleaning elements and/or one or more tooth polishing elements.

Optionally, in either one of the first and second oral care implements, the oral care implement is a toothbrush.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 3A and 3B show lateral and front side views of a body of the oral care implement of FIGS. 1 and 2 during manufacture of the oral care implement;

FIGS. 4A and 4B show lateral and front side views of a subassembly comprising the body of FIGS. 3A and 3B overmolded with a first material during manufacture of the oral care implement of FIGS. 1 and 2;

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

In the following description, each of the exemplary embodiments of the oral care implement of the invention comprises a manually-operated oral care implement, more specifically a manually-operated toothbrush. However, in variations to these embodiments, the oral care implement could instead comprise a powered oral care implement, such as a powered toothbrush, wherein one or more cleaning elements provided to the head of the implement are drivable so as to be moved relative to the handle of the implement. In still further embodiments, the oral care implement could instead comprise other forms of oral care implement, such as a soft-tissue cleaner, a tooth polisher, or another implement designed for oral care. It is to be understood that other embodiments may be utilised, and that structural and functional modifications may be made without departing from the scope of the present invention.

Figure 1:
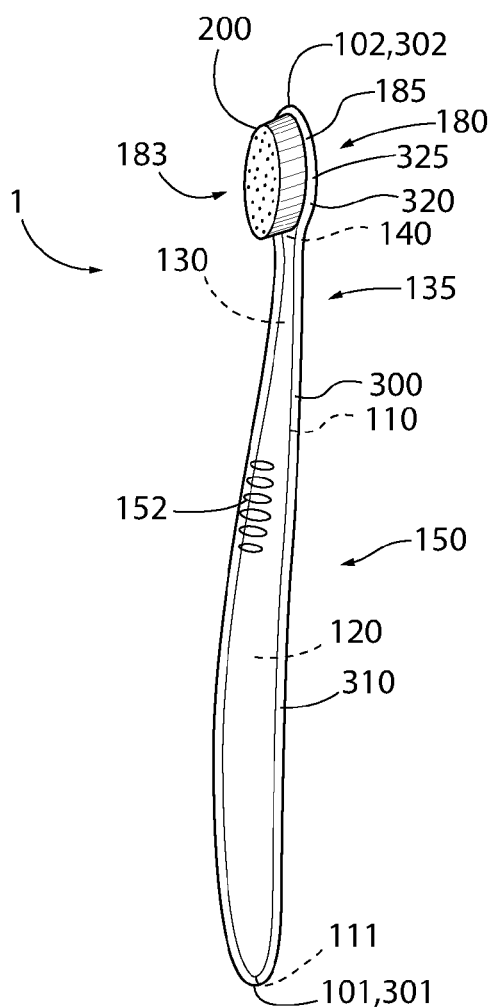
FIG. 1 shows a perspective view of a front side of an oral care implement according to an exemplary embodiment of the present invention.
Figure 2:
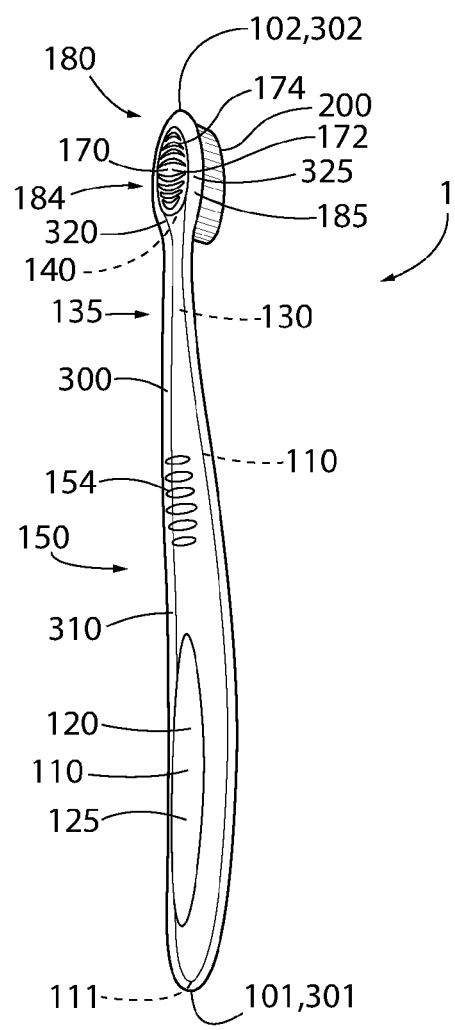
FIG. 2 shows a perspective view of a rear side of the oral care implement of FIG. 1.
Figure 6:
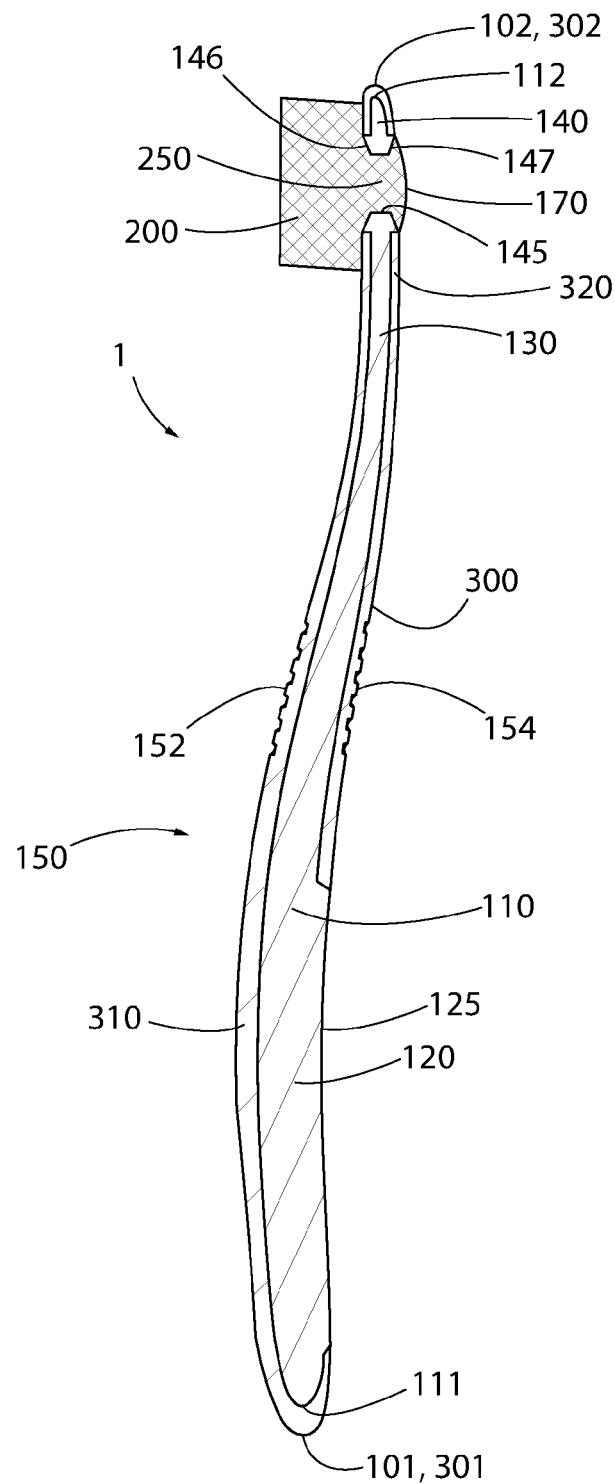
FIG. 6 shows a cross section view of the oral care implement of FIGS. 1 and 2, taken along the line VI-VI of FIG. 5B.

FIGS. 1, 2 and 6 illustrate an oral care implement, in this case a toothbrush, according to an exemplary embodiment of the present invention, generally designated with the reference numeral 1. The toothbrush 1 generally comprises a head 180 connected to a handle 150, and is formed from a body 110, oral care elements 200 of a second material, and a layer 300 of first material that covers most of a surface area of the body 110. These elements will be discussed in turn.

With reference to FIGS. 3A and 3B, the body 110 comprises a handle portion 120, a head portion 140 and a neck portion 130, which neck portion 130 connects the handle portion 120 to the head portion 140. The head portion 140 of the body 110 has a first, proximal end 141 and a second, distal end 142. The handle portion 120 has a first, proximal end 121 and a second, distal end 122. The neck portion 130 connects the distal end 122 of the handle portion 120 to the proximal end 141 of the head portion 140. The neck portion 130 is generally of a smaller cross sectional area than at least the distal end 122 of the handle portion 120 and, in some embodiments, the neck portion 130 is generally of a smaller cross sectional area than all of the handle portion 120. The neck portion 130 has a first, proximal end 131 fixed to and closest to the distal end 122 of the handle portion 120, and a second, distal end 132 fixed to and closest to the proximal end 141 of the head portion 140. The proximal end 121 of the handle portion 120 and the distal end 142 of the head portion 140 form respective first, proximal and second, distal ends 111, 112 of the body 110, and the body 110 is elongate between the first and second ends 111, 112 of the body 110.

The head portion 140 is connected to the handle portion 120 via the neck portion 130. In this embodiment, the head portion 140, neck portion 130 and handle portion 120 are formed as an integral structure using an injection molding process. The head portion 140, handle portion 120 and neck portion 130 are together a single, unitary structure. That is, the body 110 is a unitary body. However, in other embodiments, the head portion 140 and the neck portion 130 together may be formed as a separate component from the handle portion 120, which separate components are operably connected at a later stage of the manufacturing process by any suitable technique known in the art, including without limitation thermal welding, sonic welding, a tight-fit assembly, a coupling sleeve, adhesion, fasteners, and a snap-fit connection. Whether the head and neck portions 140, 130 and the handle portion 120 are constructed as a single piece or a multi-piece assembly (including connection techniques) is not limiting of the present invention in all embodiments. Furthermore, other manufacturing techniques may be used in place of and/or in addition to injection molding to create the handle portion 120 and/or the head portion 140 (or components thereof) and/or the neck portion 130, such as milling and/or machining and/or additive manufacturing.

The head portion 140 of the body 110 has a first, front side 143 and a second, rear side 144, opposite to the first side 143. Moreover, the head portion 140 of the body 110 has a hole 145 extending therethrough from the first side 143 to the second side 144. The hole has an axis extending from the first side 143 to the second side 144. In this embodiment, the hole 145 has a substantially elliptical cross sectional shape perpendicular to the axis defined by one or more walls of the head portion 140 of the body 110. In variations to the illustrated embodiment, the hole 145 has a different cross sectional shape perpendicular to the axis, such as circular, polygonal, square, rectangular, triangular or irregular, defined by one or more walls of the head portion 140 of the body 110. Moreover, while in the illustrated embodiment only one hole 145 extends through the head portion 140 of the body 110, in variations to the illustrated embodiment, a plurality of holes extend through the head portion 140 of the body 110. Each of the holes may have any one of the above-mentioned cross sectional shapes. The holes may all have the same one of the above-mentioned cross sectional shapes.

In this embodiment, the body 110 is formed of a plastic, specifically a thermoplastic polymer, more specifically polypropylene (PP). However, in variations to this embodiment, the body 110 may instead or additionally be formed of a different material, such as a different plastic or thermoplastic polymer. The body 110 may instead or additionally be formed of any one or more of the following materials: polypropylene (PP), polyethylene, polyamide, polyester, cellulosics, styrene-acrylonitrile (SAN), acrylic, acrylonitrile butadiene styrene (ABS) and a thermoplastic. Preferably, the body 110 is opaque, or at least more opaque than the layer 300. However, the body 110 may be transparent or translucent.

The oral care elements 200 extend from a front side of the toothbrush 1 and are for cleaning or polishing surfaces in a user's mouth, such as surfaces of their teeth. In this embodiment, the oral care elements 200 comprise a plurality of tooth cleaning elements in the form of a field of thermoplastic elastomer (TPE) fingers or bristles, preferably in the form of tapered elastomeric elements. However, in variations to this embodiment, the oral care elements 200 may additionally or alternatively comprise one or more tooth polishing elements, preferably in the form of elastomeric tooth polishing elements, such as elastomeric protrusions, elements, fingers, or prophylactic (prophy) cups. Whether the oral care elements 200 comprise one or more tooth cleaning elements or one or more tooth polishing elements of the types discussed, in some embodiments the toothbrush 1 may further comprise additional oral care elements of at least one of any one or more of the following, without limitation: bristles, rigid bristles, flexible bristles, filament bristles, fibre bristles, nylon bristles, tapered bristles, spiral bristles, rubber bristles, elastomeric protrusions, elastomeric elements, flexible polymer protrusions, co-extruded filaments, flag bristles, crimped bristles, anti-bacterial bristles and combinations thereof and/or structures containing such materials or combinations. Such additional oral care elements may be located at, and extend outward from, one or both lateral edges of a first side 183 of the head 180 and/or may be located at, and extend outward from, a distal end of the first side 183 of the head 180 and/or may surround the oral care elements 200.

The oral care elements 200 are together a single, unitary structure. That is, the oral care elements 200 form a unitary body formed of the second material. In this embodiment, the second material is an opaque resilient material, specifically a thermoplastic elastomer (TPE). However, in variations to this embodiment, the second material may instead or additionally be any one or more of the following materials: a resilient material, an elastomeric material, an elastomer, a thermoplastic elastomer (TPE), and styrene-ethylene/butylene-styrene (SEBS). In variations to this embodiment, the second material may be transparent or translucent. The second material of the oral care elements 200 extends through the hole 145 in the head portion 140 of the body 110 and forms a member 250 in the hole 145, as will be described in more detail below.

Figure 5A:
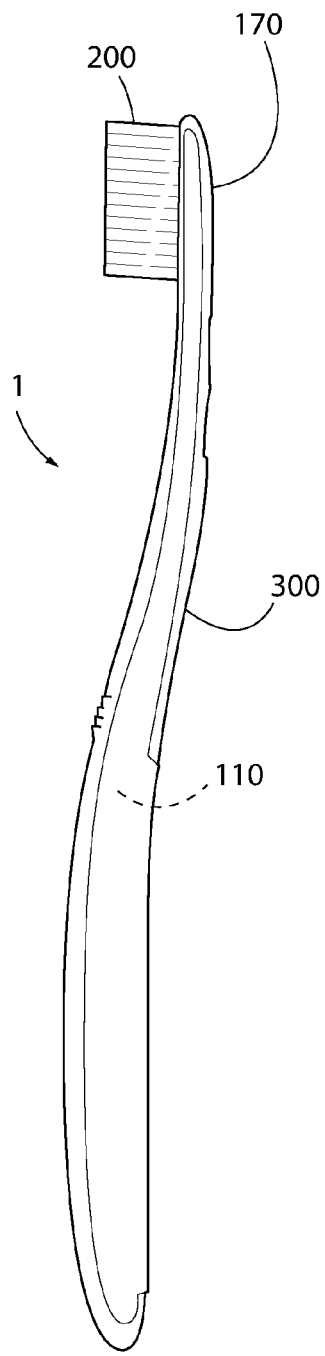
FIGS. 5A and 5B show lateral and front side views of the oral care implement of FIGS. 1 and 2 comprising the subassembly of FIGS. 4A and 4B with oral care elements of a second material provided on a head section of the subassembly.

The layer 300 of first material comprises a first portion 310 and a second portion 320. That portion of the layer 300 of first material on the handle and neck portions 120, 130 of the body 110 is the first portion 310 of the layer 300 of first material, and that portion of the layer 300 of first material on the head portion 140 of the body 110 is the second portion 320 of the layer 300 of first material. In the final toothbrush 1, as can be seen in FIGS. 1, 2 and 4B to 6, the layer 300 of first material covers most of a surface area of the handle and neck portions 120, 130 of the body 110, and most of a surface area of the head portion 140 of the body 110. In particular, as can be seen in FIGS. 2 and 5A, the first portion 310 of the layer 300 of first material covers all of the surface area of the neck and handle portions 120, 130, including the first end 111 of the body 110, except for a thin elongate part 125 of the handle portion 120 on a rear side of the toothbrush 1, opposite to the front side of the toothbrush 1. Accordingly, the first portion 310 of the layer 300 of first material covers a majority of, indeed more than 75% or 90% of, the surface area of the neck and handle portions 120, 130 of the body 110. Moreover, as can be seen in FIGS. 4A and 4B, the second portion 320 of the layer 300 of first material covers all of the surface area of the head portion 140, including the second end 112 of the body 110, except for a wall or walls defining the hole 145 and respective small annular portions 146, 147 of the first and second sides 143, 144 around respective first and second ends of the hole 145. Accordingly, the second portion 320 of the layer 300 of first material covers a majority of, indeed more than 75% or 90% of, the surface area of the head portion 140 of the body 110.

In variations to the illustrated embodiment, the first portion 310 of the layer 300 of first material may cover all of the surface area of the neck and handle portions 120, 130 of the body 110, and/or the second portion 320 of the layer 300 of first material may cover all of the surface area of the head portion 140 of the body 110.

In this embodiment, the first material is a resilient material, specifically a thermoplastic elastomer (TPE). However, in variations to this embodiment, the first material may instead or additionally be any one or more of the following materials: a resilient material, an elastomeric material, an elastomer, a thermoplastic elastomer (TPE), and styrene-ethylene/butylene-styrene (SEBS). Preferably, the first material is less rigid or hard than the material from which the body 110 is formed. Moreover, preferably the first material is a translucent or transparent material, so that the body 110 is visible through the layer 300 as shown in FIGS. 1, 2 and 4A to 5B. In this embodiment, the first material, and thus the layer 300, is transparent. In variations to this embodiment, the first material, and thus the layer 300, may be opaque or translucent.

As best shown by FIG. 6, the handle 150 of the toothbrush 1 comprises the handle and neck portions 120, 130 of the body 110 and the first portion 310 of the layer 300 of first material. The handle 150 provides the user with a mechanism by which he/she can readily grip and manipulate the toothbrush 1, includes ergonomic features, such as front and rear undulating grips 152, 154 formed by the first portion 310 of the layer 300 of first material, which provide a high degree of control for the user while maintaining comfort, and may be formed of many different shapes and with a variety of constructions. Although the handle 150 is a non-linear structure in the illustrated embodiment, in certain other embodiments the toothbrush 1 may have a simple linear handle 150.

As also best shown by FIG. 6, the head 180 of the toothbrush 1 comprises the head portion 140 of the body 110, the oral care elements 200, and the second portion 320 of the layer 300 of first material. All of a surface area of the head portion 140 is covered with one or both of the first and second materials, as will be discussed below. More specifically, the wall or walls defining the hole 145, and the annular portions 146, 147 of the first and second sides 143, 144 of the head portion 140, are covered with the second material and not the first material, so that the second material is bonded (mechanically, chemically and/or through the use of an additional adhesive) to the wall or walls defining the hole 145, and the annular portions 146, 147. The distal end 142 of the head portion 140, and lateral sides of the head portion 140 that connect the first and second sides 143, 144, is covered with the first material and not the second material. The rest of the first and second sides 143, 144 of the head portion 140 are covered with both the first and second materials, with the first material located between the head portion 140 and the second material.

The head 180 generally comprises the first side 183 and a second side 184 opposite to the first side 183. The first side 183 and the second side 184 of the head 180 can take on a wide variety of shapes and contours, none of which are limiting of the present invention. For example, the first and second sides 183, 184 can be planar, contoured or combinations thereof. The first side 183 and second side 184 are joined by a peripheral or lateral side 325 of the second portion 320 of the layer 300 of first material, which is a peripheral or lateral side 185 of the head 180. The oral care elements 200 are located at, and extend outward from, the first side 183 of the head 180 for contact with an oral surface, preferably teeth.

While the oral care elements 200 are particularly suited for cleaning teeth, the cleaning elements can be used to clean oral soft tissue, such as a tongue, gums, or cheeks instead of or in addition to teeth. As used herein, the term "oral care element" is used in a generic sense to refer to any structure that can be used to clean, massage or polish an oral surface, such as teeth or soft tissue, through relative surface contact. Indeed, in a variation to the embodiment shown in FIGS. 1 and 2, instead of tooth cleaning elements 200 there is instead provided at least one tooth polishing element. The at least one tooth polishing element may have one or more proximal ends that are connected to the head portion 140 of the head 180 in substantially the same manner as the proximal ends of the plurality of tooth cleaning elements of the illustrated embodiment.

At the second side 184 of the head 180 is located a pad comprising a soft tissue cleaner 170 formed of the second material. In the embodiment of FIGS. 1 and 2, the oral care elements 200 are joined to the pad by a member 250 (see FIG. 6) of the second material located in the hole 145 in the head portion 140 of the body 110. That is, the second material of the oral care elements 200 and the pad extends through the hole 145, and the oral care elements 200 are unitary with the pad and the member 250. The soft tissue cleaner 170 comprises a surface 172 of the pad 170 and a plurality of protrusions 174 protruding from the surface 172 of the pad 170 so that distal ends of the protrusions 174 are spaced from the surface 172 of the pad. While in the illustrated embodiment each of the protrusions 174 is an arched, wall-like protrusion 174, in variations to the illustrated embodiment, each of the protrusions 174 may have a different shape. For example, each of the protrusions 174 may be a nub, a ridge, linear, curved, circular, chevron-shaped or a still different shape.

The toothbrush 1 further has a neck 135 that is part of the handle 150 and that comprises the neck portion 130 of the body 110 and part of the first portion 310 of the layer 300 of first material. The neck 135 is of a smaller cross sectional area than each of the head 180 and the rest of the handle 150. In variations to the illustrated embodiment, the part of the handle 150 connected to and closest to the head 180 may have the same cross sectional area and shape as one or both of the head 180 and the rest of the handle 150, so that the toothbrush 1 does not comprise a neck 135 as such.

Generally, the toothbrush 1 extends from a proximal end 101, which is also a proximal end 301 of the layer 300 of first material, to a distal end 102, which is also a distal end 302 of the layer 300 of first material. The proximal end 301 of the layer 300 of first material is part of the first portion 310 of the layer 300 that covers the first end 111 of the body 110, and the distal end 302 of the layer 300 of first material is part of the second portion 320 of the layer 300 that covers the second end 112 of the body 110.

In variations to the illustrated embodiment, the pad comprising the soft tissue cleaner 170 may be omitted. In some such embodiments, the member 250 of the second material may still be unitary with the oral care elements 200 and provided in the hole 145, so as to help anchor the oral care elements 200 to the rest of the toothbrush 1. In other such embodiments, the hole 145 and the member 250 of the second material may be omitted and the oral care elements 200 may be anchored to the rest of the toothbrush 1 by some other mechanism, such as through the use of mechanical, adhesive or chemical bonding of the second material of the oral care elements 200 to the rest of the toothbrush 1.

In variations to the illustrated embodiment, the first material may be provided on the wall or walls defining the hole 145 and/or on the respective small annular portions 146, 147 of the first and second sides 143, 144 around the respective first and second ends of the hole 145. Thus, in some such embodiments, all of the first and second sides 143, 144 of the head portion 140 may be covered with both the first and second materials, with the first material located between the head portion 140 and the second material.

A method of manufacturing the oral care implement 1 of FIGS. 1 and 2 will now be described with particular reference to FIGS. 3A to 5B.

First, as shown in FIGS. 3A and 3B, the body 110 is provided. As discussed above, in the illustrated embodiment, the body 110 comprises the handle portion 120 and the head portion 140 connected to the handle portion 120 by the neck portion 130. As also discussed above, the head portion 140 has the hole 145 extending therethrough from the first side 143 of the head portion 140 to the second side 144 of the head portion 140 opposite to the first side 143. In the present embodiment, the body 110 is provided by injection molding a material, in this case an opaque thermoplastic polymer, specifically polypropylene (PP), in a suitably shaped first mold cavity. However, in variations to this embodiment, the body 110 may instead or additionally be formed of a different material, such as a different plastic or thermoplastic polymer. The body 110 may instead or additionally be formed of any one or more of the following materials: polypropylene (PP), polyethylene, polyamide, polyester, cellulosics, styrene-acrylonitrile (SAN), acrylic, acrylonitrile butadiene styrene (ABS) and a thermoplastic. The body 110 may instead be formed of a transparent or a translucent material. As further discussed above, other manufacturing techniques may be used in place of and/or in addition to injection molding to create the body 110, such as milling and/or machining and/or additive manufacturing.

Next, as shown in FIGS. 4A and 4B, the layer 300 of first material is provided on the handle, neck and head portions 120, 130, 140 of the body 110 to form a subassembly 2. The layer 300 of first material is provided on the body 110 by injection molding. More specifically, the body 110 is removed from the first mold cavity, then the body 110 is located in a suitably shaped second mold cavity so that spaces to be filled by the first material are provided in the second mold cavity around the body 110, and then the first material is injected into the spaces. The subassembly 2 comprises a handle section 21, corresponding to the handle 150 of the finished implement 1, which handle section 21 comprises the handle and neck portions 120, 130 of the body 110 and the first portion 310 of the layer 300 of first material. The subassembly 2 also comprises a head section 22 connected to the handle section 21 and comprising the head portion 140 of the body 110 and the second portion 320 of the layer 300 of first material. During this step of the method, the first material is provided on both of the first and second ends 111, 112 of the body 110, so that both proximal and distal ends of the subassembly 2, corresponding to the proximal and distal ends 101, 102 of the finished implement 1, are formed from the first material. Since in this embodiment the first material is less rigid than the material of the body 110, the subassembly 2 and the finished implement 1 are provided with cushioned proximal and distal ends.

In this exemplary method of manufacture, the first material is provided on most of a surface area of the handle and neck portions 120, 130 of the body 110, and most of a surface area of the head portion 140 of the body 110. In particular, the first material is provided on all of the surface area of the neck and handle portions 120, 130, including the first end 111 of the body 110, except for a thin elongate part 125 of the handle portion 120 on a rear side 26 of the subassembly 2, opposite to a front side 25 of the subassembly 2. Accordingly, the first material is provided on a majority of, indeed more than 75% or 90% of, the surface area of the neck and handle portions 120, 130 of the body 110. Although not shown in the Figures, in some embodiments the elongate part 125 of the handle portion 120 includes indicia indicating the source or manufacturer of the implement 1. Moreover, the first material is provided on all of the surface area of the head portion 140, including the second end 112 of the body 110, except for the wall or walls defining the hole 145 and the respective small annular portions 146, 147 of the first and second sides 143, 144 around the respective first and second ends of the hole 145. Accordingly, the first material is provided on a majority of, indeed more than 75% or 90% of, the surface area of the head portion 140 of the body 110. In variations to the illustrated embodiment, the first material is provided on all of the surface area of the neck and handle portions 120, 130 of the body 110, and/or the first material is provided on all of the surface area of the head portion 140 of the body 110.

In this exemplary method of manufacture, the first material is a resilient material, specifically a thermoplastic elastomer (TPE). However, in variations to this embodiment, the first material may instead or additionally be any one or more of the following materials: a resilient material, an elastomeric material, an elastomer, a thermoplastic elastomer (TPE), and styrene-ethylene/butylene-styrene (SEBS). In the exemplary method, the first material is less rigid or hard than the material from which the body 110 is formed. Moreover, in the exemplary method, the first material is a transparent material that forms a transparent layer 300 in the finished toothbrush 1, so that the body 110 is visible through the layer 300 as shown in FIGS. 1, 2 and 4A to 5B. However, in variations to this embodiment, the first material may be translucent or opaque.

Preferably, the first material chemically bonds to the body 110. However, in some embodiments, depending on the material of the body 110 and the first material, it may be necessary to apply a suitable adhesive to the surface of the body 110, before providing the first material on the body 110, and then allowing the adhesive to cure, set or cool after providing the first material on the body 110, thereby to adhere the first material to the body 110. Additionally or alternatively, various structures including, for example, recesses, grooves, and/or protruding portions (not shown) may be formed at a plurality of locations on the surface of the body 110 to allow the first material to be mechanically coupled to the material to the body 110.

Preferably, the formation of the subassembly 2 leaves the hole 145 unblocked by the first material, so that in the formed subassembly 2 the hole 145 is not blocked with the first material. For example, the hole 145 may be left free, or substantially free, of the first material. For example, the wall or walls defining the hole 145 may be free of the first material, or the wall or walls may be coated with a thin layer of the first material. In other embodiments in which the first material completely or substantially completely blocks the hole 145 in the formed subassembly 2, preferably at least some of the first material in the hole 145 is removed after forming the subassembly 2, e.g. by drilling or punching through the first material in the hole 145.

Figure 5B:
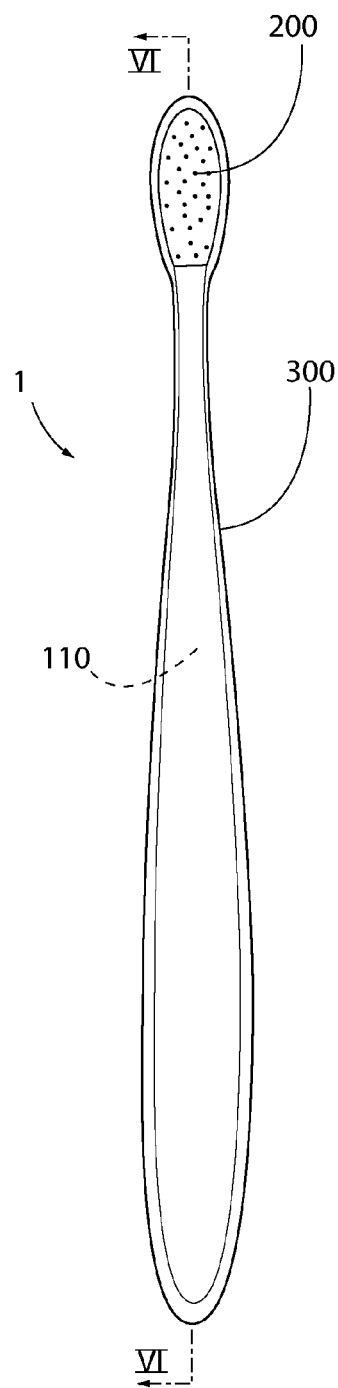

After formation of the subassembly 2, the oral care elements 200, comprising a plurality of tooth cleaning elements in the present embodiment, are then provided on the head section 22 of the subassembly 2, as shown in FIGS. 5A and 5B. The oral care elements 200 are provided on the head section 22 by injection molding the second material onto the head section 22 to form both the oral care elements 200 on the head section 22 and the member 250 of the second material in the hole 145, which member 250 is unitary with the oral care elements 200. More specifically, the subassembly 2 is removed from the second mold cavity, then the subassembly 2 is located in a suitably shaped third mold cavity so that spaces to be filled by the second material are provided in the third mold cavity around the subassembly 2, and then the second material is injected into the spaces.

In this exemplary method of manufacture, the second material is an opaque resilient material, specifically a thermoplastic elastomer (TPE). However, in variations to this embodiment, the second material may instead or additionally be any one or more of the following materials: a resilient material, an elastomeric material, an elastomer, a thermoplastic elastomer (TPE), and styrene-ethylene/butylene-styrene (SEBS). In some variations to this embodiment, the second material may be translucent or transparent.

Preferably, the second material chemically bonds to the body 110 and/or to the first material, as required. Preferably the second material chemically bonds to the wall or walls defining the hole 145, to the annular portions 146, 147, and to sections of the second portion 320 of the layer 300 of first material. However, in some embodiments, depending on the material of the body 110 and the first and second materials, it may be necessary to apply a suitable adhesive to the surface of the body 110 and/or first material, before providing the second material on the body 110 and/or on the first material, and then allowing the adhesive to cure, set or cool after providing the second material on the body 110 and/or on the first material, thereby to adhere the second material to the body 110 and/or to the first material. Additionally or alternatively, various structures including, for example, recesses, grooves, and/or protruding portions (not shown) may be formed at a plurality of locations on the surface of the body 110 and/or on the surface of the first material to allow the second material to be mechanically coupled to the material to the body 110 and/or to the first material.

In the illustrated embodiment, at the same time as providing the oral care elements 200 of the second material on a first side 23 of the head section 22, which is at the front side 25 of the subassembly 2, the injection molding of the second material on the subassembly 2 also results in the provision of the pad of the second material comprising the soft tissue cleaner 170 on a second side 24 of the head section 22, which is at the rear side 26 of the subassembly 2. That is, the oral care elements 200 and the pad are provided on the head section 22 by injection molding the second material onto the head section 22 to form all of the oral care elements 200 on the first side 23 of head section 22, the pad on the second side 24 of the head section 22, and the member 250 of the second material in the hole 145, which member 250 is unitary with both the oral care elements 200 and the pad. In some embodiments, the pad and the oral care elements 200 are held in position relative to the rest of the head 180 by the integral nature of the oral care elements 200, the member 250 and the pad. That is, in some embodiments, since the pad and the oral care elements 200 effectively "trap" the head portion 140 therebetween, the pad and the oral care elements 200 are retained in position relative to the head portion 140. Thus, in some such embodiments, it is unnecessary for the second material to be suitable for bonding, chemically or otherwise, to the material of the body 110.

After the provision of the oral care elements 200 and the soft tissue cleaner 170 on the head section 22 of the subassembly 2, the resultant toothbrush 1 is packaged ready for shipment. In some embodiments, additional processes may be carried out on the toothbrush 1 prior to packaging, such as trimming of the oral care elements 200, de-burring portions of the toothbrush 1, or adding indicia or information to portions of the toothbrush 1.

Herein, reference is made to a "first material" and to a "second material". The first material may be the same colour as, or a different color to, the second material. The first material may have the same light-permeability characteristics as, or different light-permeability characteristics to, the second material. In the above specific description, both the first material and the second material is a TPE, although the first material is transparent and the second material is opaque, so that the first material is different from the second material. In some embodiments of the present invention, the second material may be the same as the first material, only applied to the subassembly 2 after application of the first material to the body 110. In some embodiments of the present invention, the second material may be the same as the first material and applied to the body 110 at the same time as the first material. In some embodiments of the present invention, the first and second materials are one material, so that elements formed from the first and second materials are unitary with one another.

In embodiments of the present invention in which one or both of the first material and second materials is a resilient material, and more so when the first material covers at least a majority of a surface area of the body, the resultant implement may be particularly comfortable to use. Resilient first material on the handle makes holding the implement comfortable, while resilient second material of the oral care elements makes cleaning or polishing oral care surfaces with the implement comfortable. In embodiments of the present invention in which the member is provided in the hole, and/or in which at least part of the second portion of the layer of first material is located between the head portion and the second material, the resultant implement may be robustly manufactured using a relatively simple process.

What is claimed is:

1. A method of manufacturing an oral care implement, the method comprising:
    (a) obtaining a body comprising a handle portion and a head portion connected to the handle portion;
    (b) providing a layer of a first material on the handle portion and the head portion to form a subassembly comprising:
        a handle section, comprising the handle portion and a first portion of the layer of the first material, and
        a head section, comprising the head portion and a second portion of the layer of the first material; and
    (c) then injection molding a second material onto at least a portion of the second portion of the layer of first material that forms a portion of a front surface of the head section to form one or more oral care elements of the second material on the head section, wherein at least a portion of the second material overlies the second portion of the layer of first material on the front surface of the head section.

2. The method of claim 1, wherein in step (a) the head portion has a hole extending therethrough from a first side of the head portion to a second side of the head portion; and
   wherein step (c) comprises injection molding the second material onto the head section to form the one or more oral care elements of the second material on the head section and a member of the second material in the hole, which member is unitary with the one or more oral care elements.

3. The method of claim 2, wherein step (c) comprises injection molding the second material onto the head section to form the one or more oral care elements of the second material on a first side of the head section and a pad of the second material on a second side of the head section, which pad is unitary with the member.

4. The method of claim 2 wherein formation of the subassembly in step (b) leaves the hole unblocked by the first material.

5. The method of claim 1, wherein step (b) comprises providing the layer of first material on at least a majority of a surface area of one or both of the handle portion and the head portion, optionally wherein step (b) comprises providing the layer of first material on at least 75% of the surface area of one or both of the handle portion and the head portion.

6. The method of claim 1, wherein the body is formed of a material that is more rigid than the first material.

7. The method of claim 1, wherein the second material is a resilient material, such as an elastomeric material, such as an elastomer, a thermoplastic elastomer (TPE), or styrene-ethylene/butylene-styrene (SEBS).

8. The method of claim 1, wherein the one or more oral care elements comprise one or more tooth cleaning elements and/or one or more tooth polishing elements.

9. A method of manufacturing an oral care implement, the method comprising:
   (a) providing a body comprising a handle portion and a head portion connected to the handle portion, the head portion having a hole extending therethrough from a first side of the head portion to a second side of the head portion;
   (b) providing a layer of first material on the handle portion and the head portion to form a subassembly comprising:
      a handle section, comprising the handle portion and a first portion of the layer of first material, and
      a head section, comprising the head portion and a second portion of the layer of first material; and
   (c) injection molding a second material onto the head section to form one or more oral care elements of the second material on the head section and a member of the second material in the hole, which member is unitary with the one or more oral care elements;
      whereby the layer of first material is on at least 90% of the surface area of the head portion.

10. The method of claim 9, wherein in step (c) is performed after step (b).

11. An oral care implement, comprising:
    a handle comprising a handle portion of a body and a first portion of a layer of first material on the handle portion; and
    a head connected to the handle, the head having a first major surface and a second major surface opposite the first major surface, and the head comprising a head portion of the body, a second portion of the layer of first material on the head portion, and one or more oral care elements of a second material;
    wherein at least part of the second portion of the layer of first material is located between the head portion and the second material in a direction extending from the first major surface of the head to the second major surface of the head;
    wherein the head portion has a hole extending therethrough from a first side of the head portion to a second side of the head portion; and
    wherein a member of the second material extends through the hole, which member is unitary with the one or more oral care elements.

12. The oral care implement of claim 11, comprising the one or more oral care elements of the second material on a first side of the head and a pad of the second material on a second side of the head, which pad is unitary with the member.

13. The oral care implement of claim 11, wherein the layer of first material is on at least a majority of a surface area of one or both of the handle portion and the head portion, optionally wherein the layer of first material is on at least 75% of the surface area of one or both of the handle portion and the head portion.

14. The oral care implement of claim 11, wherein all of a surface area of the head portion is covered with one or both of the first and second materials.

15. The oral care implement of claim 11, wherein the body is formed of a material that is more rigid than the first material.

16. The oral care implement of claim 11, wherein the second material is a resilient material, such as an elastomeric material, such as an elastomer, a thermoplastic elastomer (TPE), or styrene-ethylene/butylene-styrene (SEBS).

17. The oral care implement of claim 11, wherein the one or more oral care elements comprise one or more tooth cleaning elements and/or one or more tooth polishing elements.

18. An oral care implement, comprising:
    a handle comprising a handle portion of a body and a first portion of a layer of first material on the handle portion; and
    a head connected to the handle, the head comprising a head portion of the body, a second portion of the layer of first material on the head portion, and one or more oral care elements of a second material;
    wherein the head portion has a hole extending therethrough from a first side of the head portion to a second side of the head portion; and
    wherein a member of the second material extends through the hole, which member is unitary with the one or more oral care elements, and wherein the second material conceals at least a portion of the second portion of the layer of first material; and
    wherein at least part of the second portion of the layer of first material is located between the head portion and the second material.

* * * * *